United States Patent
St-Denis et al.

(10) Patent No.: US 10,146,820 B2
(45) Date of Patent: Dec. 4, 2018

(54) SYSTEMS AND METHODS TO ACCESS MEMORY LOCATIONS IN EXACT MATCH KEYED LOOKUP TABLES USING AUXILIARY KEYS

(71) Applicant: Freescale Semiconductor, Inc., Austin, TX (US)

(72) Inventors: Bernard F. St-Denis, Ottawa (CA); Adi Katz, Ramat Gan (IL); John F. Pillar, Ottawa (CA)

(73) Assignee: NXP USA, Inc., Austin, TX (US)

( * ) Notice: Subject to any disclaimer, the term of this patent is extended or adjusted under 35 U.S.C. 154(b) by 443 days.

(21) Appl. No.: 14/863,715

(22) Filed: Sep. 24, 2015

(65) Prior Publication Data

US 2017/0091249 A1    Mar. 30, 2017

(51) Int. Cl.
*G06F 17/30* (2006.01)

(52) U.S. Cl.
CPC .. *G06F 17/30339* (2013.01); *G06F 17/30321* (2013.01); *G06F 17/30876* (2013.01)

(58) Field of Classification Search
CPC ......... G06F 17/30309; G06F 17/30592; G06F 17/30321; G06F 17/30339
See application file for complete search history.

(56) References Cited

U.S. PATENT DOCUMENTS

| | | | |
|---|---|---|---|
| 5,819,289 A * | 10/1998 | Sanford, II | G06T 1/0028 |
| 8,359,316 B2 * | 1/2013 | Franke | G06F 17/30584 |
| | | | 707/737 |
| 8,484,439 B1 | 7/2013 | Frailong et al. | |
| 9,635,011 B1 * | 4/2017 | Wu | H04L 63/0807 |
| 9,710,506 B2 * | 7/2017 | Nath | G06F 17/30457 |
| 9,875,054 B2 * | 1/2018 | Vishniac | G06F 3/064 |
| 2004/0210588 A1 * | 10/2004 | Simkins | H04L 29/12132 |
| 2005/0083935 A1 * | 4/2005 | Kounavis | H04L 45/00 |
| | | | 370/392 |
| 2005/0198054 A1 * | 9/2005 | Sankaran | G06F 1/03 |
| 2007/0112795 A1 * | 5/2007 | Travison, Jr. | G06F 17/30327 |
| 2012/0102298 A1 * | 4/2012 | Sengupta | G06F 17/30949 |
| | | | 711/216 |
| 2015/0058595 A1 * | 2/2015 | Gura | G06F 12/1018 |
| | | | 711/206 |
| 2016/0350375 A1 * | 12/2016 | Das | G06F 17/30463 |
| 2017/0091248 A1 * | 3/2017 | Li | G06F 17/30336 |

* cited by examiner

*Primary Examiner* — Merilyn Nguyen

(57) ABSTRACT

Methods and systems are disclosed to access memory locations using auxiliary keys in addition to primary keys. Commands are received by a memory management unit to insert or access records in an exact match keyed lookup table where records include keys (i.e., primary keys), auxiliary keys, and data. When a command to insert a new record is received along with key and data, the memory management unit generates a new unique auxiliary key. The auxiliary key includes a table index generated from the key and a collision index that is unique for any records having the same table index. The key, the auxiliary key, and the data for the new record are then stored within the lookup table along with a collision pointer that links records having the same table index. Subsequently, commands to access the new record can selectively use either the original key or the auxiliary key.

20 Claims, 7 Drawing Sheets

SYSTEMS AND METHODS TO ACCESS MEMORY LOCATIONS IN EXACT MATCH KEYED LOOKUP TABLES USING AUXILIARY KEYS

TECHNICAL FIELD

This technical field relates to access techniques for exact match keyed lookup tables and, more particularly, to network packet processing systems that use such access techniques and lookup tables in processing network packets.

BACKGROUND

For packet processing systems, context data for network packet flows is often required to process network packets. A key, which is often derived from different fields of a packet representing a packet flow, is often associated with this context data. Records including the key and the context data can further be stored within a lookup table for future access and use by the packet processing system. The processing system can further apply an exact match (EM) hash function to the key to generate a primary table index for the record that determines a memory location within a lookup table to store the key and the context data (assuming no collisions). To subsequently read context data from the lookup table, a table index generated from a key associated with an access request is used to determine a memory location within the lookup table, and the record at that location is read. The key associated with the access request is compared to the key within this record to ensure that the correct record has been found in order to perform a read/write operation for the access request. If the key does not match, a collision chain can be followed, as indicated below, where records within the collision chain are read until a key match has been found within the lookup table.

Many lookup tables store large multi-byte keys that are used by processors or processing cores to identify records stored within lookup tables and to access the information stored within those records. For example, many EM algorithms and methods currently exist to identify and access records within a lookup table of "n" records (e.g., R1, R2, . . . Rn) where each record (e.g., R1) includes "m" different fields or data items (e.g., R1-1, R1-2, . . . R1-m) and where one field or data item within each "i" record (e.g., Ri-1) is equal to a unique value called the key. For many EM algorithms, the size of this key may be large, such as tens to hundreds of bytes, and the size of keys within the lookup table may be variable such that the key size can be different for each record. For example, with respect to packet processing systems, the key can include data based upon one or more fields within the packet and can include data defining the length of the key itself (e.g., key size is equal to length field plus data).

As indicated above, some EM algorithms and related lookup tables use table index values generated from the keys, for example by applying a hash function to the keys, to determine memory locations for data records within the lookup tables. The key and the context data are stored for each record using the table index generated from the key, and the table index is used subsequently to locate the record. It is possible, however, for the table index values for different keys to be identical thereby cause index or hash collisions. As such, EM algorithms often identify records having a particular table index value and then search those records to match the key associated with the access request. The large size and variability of the keys, however, can be difficult to manage by applications operating as part of the processing system. Further, there are no fixed keys associated with each record that can be used to management purposes by the processing system.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Figure 1:
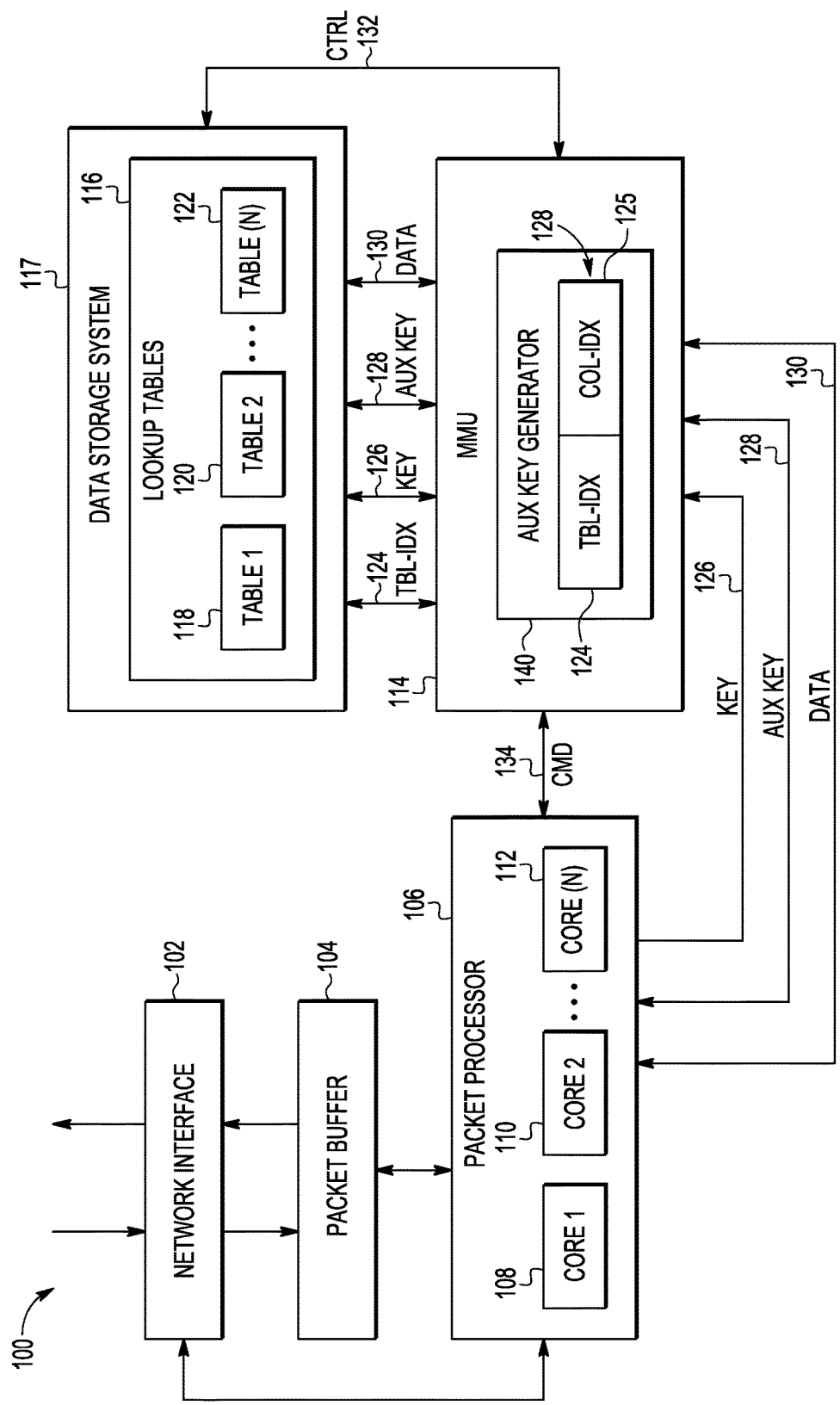
FIG. 1 is a block diagram of a packet processing system including a memory management unit that generates unique auxiliary keys using an auxiliary key generator that are in addition to keys for exact match (EM) keyed lookup tables.

Methods and systems are disclosed to access memory locations within exact match keyed lookup tables using auxiliary keys in addition to primary keys. For the disclosed embodiments, commands are received by a memory management unit to insert or access records in an exact match (EM) keyed lookup table within a data storage system where the records include keys (i.e., primary keys), auxiliary keys, and data. When a command to insert a new record is received along with key and data associated with the command, the memory management unit generates a new unique auxiliary key for the new record. The auxiliary key includes a table index generated from the key and a collision index that is unique for any records having the same table index. The key, the auxiliary key, and the data for the new record are then stored within the lookup table along with a collision pointer that links records having the same table index. Subsequently, commands to access the new record can selectively use either the original key for a key based lookup or the auxiliary key for an auxiliary key based lookup. A variety of additional or different features and variations can also be implemented.

In operation, the disclosed embodiments simplify and enhance access to records within exact match (EM) keyed lookup tables by providing additional auxiliary keys that include indices based upon a key and that include a collision index (COL-IDX) that is unique for a given collision chain of records within the EM keyed lookup table. Through the use of these additional auxiliary keys, the disclosed embodiments enhance traditional exact matching (EM) methods and algorithms as well as their underlying data structures by providing an additional access mechanism that remains valid for as long as the records exist in the lookup table. When a new record is inserted into the lookup table, a new unique auxiliary key is generated for this new record by combining a table index generated from the key with a collision index (COL-IDX) that is unique within any given collision chain of records having the same table index. Further, the range or bit size of the auxiliary key can be relatively small and can be selected to be only large enough to exceed an expected maximum number of hash collisions. For example, where a maximum of sixteen (16) collisions is expected for any given collision chain of records having matching table index values, a four-bit value can be used for the collision index portion of the auxiliary key. It is also noted that the maximum number of expected collisions or maximum expected length for the collision chain can also be based upon a statistical likelihood of such collision occurrences, mechanisms within the processing system that restrict the number of insertions having a particular table index value, mechanisms within the processing system that rely secondary hash or collision chains after a certain number of insertions having a particular table index value, and/or other desired considerations. By enhancing EM keyed lookup tables with persistent additional fixed-size auxiliary keys that are unique to the EM keyed lookup table, the disclosed embodiments provide greater flexibility and ease of access to records within EM keyed lookup tables.

It is noted that a variety of techniques can be used, as desired, to generate the collision index for a given record. For example, the existing collision index values can be determined for records that have table index values that match the table index for new key/data to be stored in the lookup table, and then a random value can be generated that does not match one of the existing collision index values. As another example, a counter can be used to generate a collision index by incrementing the current counter value until a unique value within a collision chain is identified. Other techniques could also be implemented to provide a unique collision index, as desired, so that the collision index does not match an existing collision index used within an existing record having the same table index.

FIG. 1 is a block diagram of a packet processing system 100 including a memory management unit 114 that generates auxiliary keys 128 for lookup tables 116, such as exact match (EM) keyed lookup tables, using an auxiliary key generator 140. The lookup tables 116 can include one or more different lookup tables 118, 120, . . . 122 (TABLE1, TABLE2, . . . TABLE(N)) that are stored with a data storage system 117. The memory management unit 114 communicates with the data storage system 117 to provide a key 126, an auxiliary (AUX) key 128, and data 130 for each record to be inserted and stored within the lookup tables 116. The memory management unit also uses indices (TBL-IDX) 124 to access memory locations within the lookup tables 116, and these indices (TBL-IDX) 124 are stored along with collision indices (COL-IDX) as auxiliary keys 128 within the records for the lookup tables 116. Additional control (CTRL) information 132 can also be communicated between the memory management unit 114 and the data storage system 117. The memory management unit 114 can use the control information 132, for example, to select which of a plurality of lookup tables 116 is to be accessed and/or for other operational purposes. In addition, the auxiliary key 128 for each record can also include a table identifier that determines which of the lookup tables 118, 120, . . . 122 to use to store the record. The memory management unit 114 is also configured to perform key based lookups of records within the lookup tables 116 using a table index 124 and a key 126 and to perform auxiliary key based lookups of records within the lookup tables 116 using an auxiliary key 128. When a new record is inserted in the lookup tables 116, the auxiliary key generator 140 generates a table index 124 based upon the key 126, generates a unique collision index (COL-IDX) 125, and then combines them to form an auxiliary key 128 that is stored for that record. As indicated above, a table identifier can also be included within the auxiliary key 128, if desired, to identify the table within which the record is stored.

For the packet processing system embodiment 100 depicted in FIG. 1, network packets are communicated to and from a packet network communication system through network interface 102. Received packets and packets to be transmitted are stored within the packet buffer 104. The packet processor 106 communicates with the packet buffer 104 to receive data associated with received packets and to provide data associated with packets to be transmitted. The packet processor 106 also communicates with the network interface 102, for example, to provide control information concerning the reception and transmission of packets. The packet processor 106 communicates with the memory management unit 114 to provide commands 134, such as insertion commands to insert records into lookup tables 116 and other record access commands such as deletion commands to delete records from lookup tables 116, read commands to read data from records within lookup tables 116, and write commands to write data to records within lookup tables 116. The packet processor 106 also communicates a key 126, an auxiliary key 128, and/or data 130 associated with such commands to insert/delete/read/write a record within the lookup tables 116. The packet processor 106 can also include one or more processing cores 108, 110, . . . 112 (CORE1, CORE2, . . . CORE(N)) that can each provide record insertion commands or other record access (e.g., read, write, delete, etc.) commands to the memory management unit 114. Further, while a packet processing system 100 and packet processor 106 are depicted in embodiment 100, other processing systems, processors, and/or processing devices can also take advantage of the auxiliary key techniques described herein for EM keyed lookup tables.

As described in more detail herein, the auxiliary keys 128 generated by the auxiliary key generator 140 are unique within any particular collision chain of records within a particular lookup table. As used herein, a collision chain refers to multiple records in a particular lookup table that have matching indices (TBL-IDX) 124. In operation, when a record is inserted into the lookup tables 116, the chain of any colliding records with the same table index 124 are traversed while noting each existing collision index (COL-IDX) value already in use and stored within that chain. A new unique collision index (COL-IDX) 125 within that chain is then picked (e.g., randomly) while avoiding existing collision index (COL-IDX) values already in use. This new value for the collision index (COL-IDX) 125 is then stored as part of the auxiliary key 128 for the newly inserted record along with the table index 124. If the location for the record is later moved, the auxiliary key 128 for the record, which includes the table index 124 and the collision index (COL-IDX) 125, is left unchanged. To access the new record, either a key based access or an auxiliary key based access can be used by a requesting processor or device. In particular, for the key based access, records are accessed by using the table index to locate records in a lookup table and then by matching the record's key. For the auxiliary key based access, records are accessed by using the table index to locate records in a lookup table and then by matching the record's auxiliary key, which again includes the table index and the collision index. For either search technique, table collision chains can be searched for records matching the key or for records matching the collision index, respectively.

It is noted that the memory management unit (MMU) 114 can be implemented as a hardware accelerator or other processing unit that is configured to communicate with the data storage system 117 to access and modify the lookup tables 116. It is noted that data 130 can be any desired data to be stored in the lookup tables 116. For example, with respect to packet processing system 100, the data 130 can be context data or other meta data associated with received packets. It is also noted that the lookup data storage system 117 can be implemented using one or more data storage devices (e.g., flash memory, random access memory, read only memory, programmable memory devices, reprogrammable storage devices, hard drives, floppy disks, DVDs, CD-ROMs, and/or any other data storage devices) that stores one or more different lookup tables 118, 120, ... 122 (TABLE1, TABLE2, TABLE(N)) for the lookup tables 116. It is also noted that the different lookup tables 118, 120, ... 122 may be stored in different data storage devices (e.g., one or more in slower devices and one or more in faster devices). In addition, it is again noted that while the packet processing system 100 processes network packets, it is understood that the auxiliary key techniques for searching of EM keyed lookup tables can be used in other types of processing systems, processors, and/or processing devices.

Figure 2:
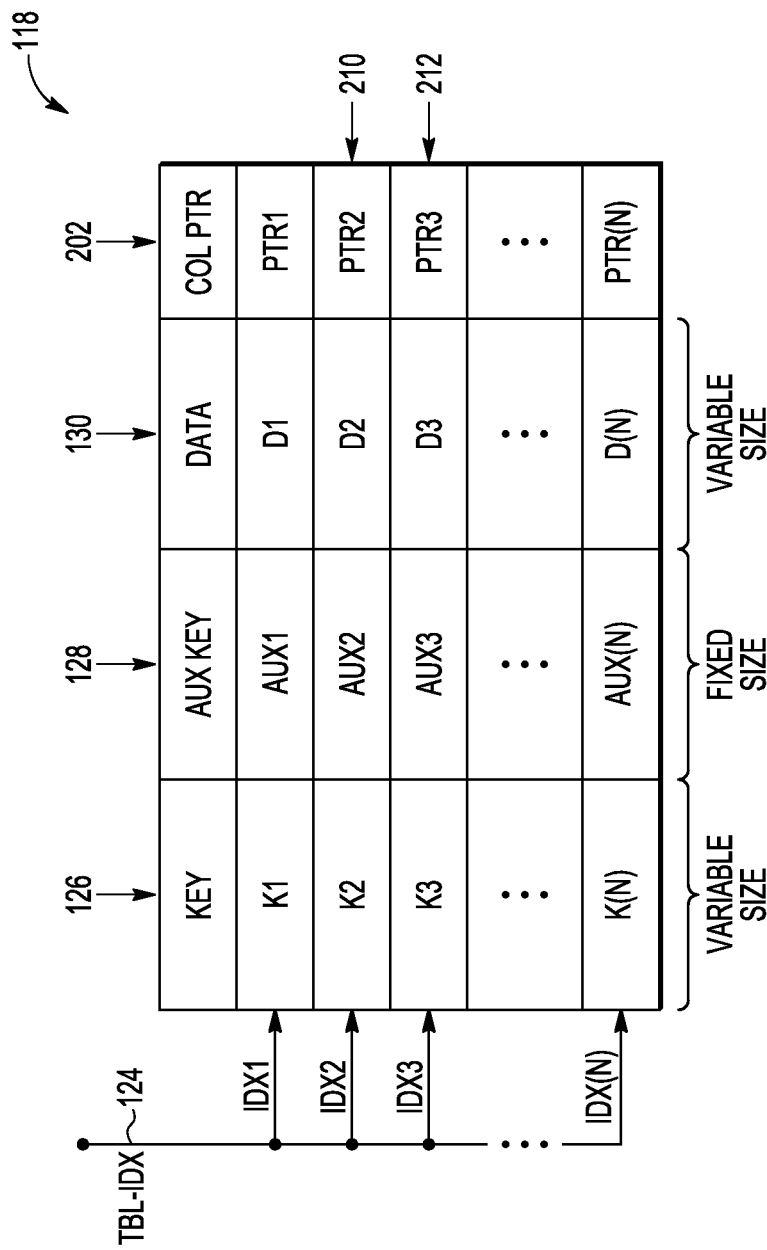
FIG. 2 is a block diagram of an example embodiment for an EM keyed lookup table stored within a data storage system that includes additional auxiliary keys.

FIG. 2 is a block diagram of an example embodiment for a lookup table such as lookup table 118 (TABLE1) within the one or more lookup tables 116. Each of the records within the example lookup table 118 includes a key 126 (KEY1, KEY2, KEY3, ... KEY(N)), an auxiliary key 128 (AUX1, AUX2, AUX3, ... AUX(N)), and data 130 (D1, D2, D3, ... D(N)). As described above, each auxiliary key 128 includes a table index (TBL-IDX) 124 and a collision index (COL-IDX) 125. Further, each record also includes a field for a collision pointer 202 (PTR1, PTR2, PTR3, ... PTR(N)) that points to the next record in a collision chain should the record be part of a collision chain having multiple records.

For lookup table 118, each memory location is associated with a primary table index value (IDX1, IDX2, IDX3, ... IDX(N)). Records are stored in these memory locations as primary records or non-primary records. A record within lookup table 118 is a primary record if it is located at the memory location associated with a table index (TBL-IDX) 124 generated from the key 126 for that record. For example, if IDX2 were generated for record 210 from its key K2, record 210 would be a primary record within lookup table 118 as it is stored at the memory location associated with IDX2. A record within the lookup able 118 is a non-primary record if it is in a collision chain with a primary record and is located at a memory location not associated with a table index (TBL-IDX) 124 generated from the key 126 for that record. For example, if IDX1 were generated for record 212 from its key K3, record 212 would be a non-primary record within lookup table 118 as it is stored at the memory location associated with IDX3 and not IDX1. Record 212 would instead be a non-primary record within an IDX1 collision chain.

As shown in FIG. 2, the key 126 and the data 130 can be variable size for each record while the auxiliary key 128 can be a fixed length for each record. For example, the table index (TBL-IDX) 124 portion for each record can be a 28-bit value generated from a hash function applied to the key 126 for the record, and the collision index (COL-IDX) 125 for reach record can be a four-bit value generated by the auxiliary key generator 140 as a unique value within any given collision chain. As such, while the key based matching relies upon variable-sized keys 126 that can be very large (e.g., 100 bits or more), the auxiliary key based matching relies upon fixed-size auxiliary keys 128 that are relatively small (e.g., 32 bits or less). Other variations can also be implemented.

Figure 3A:
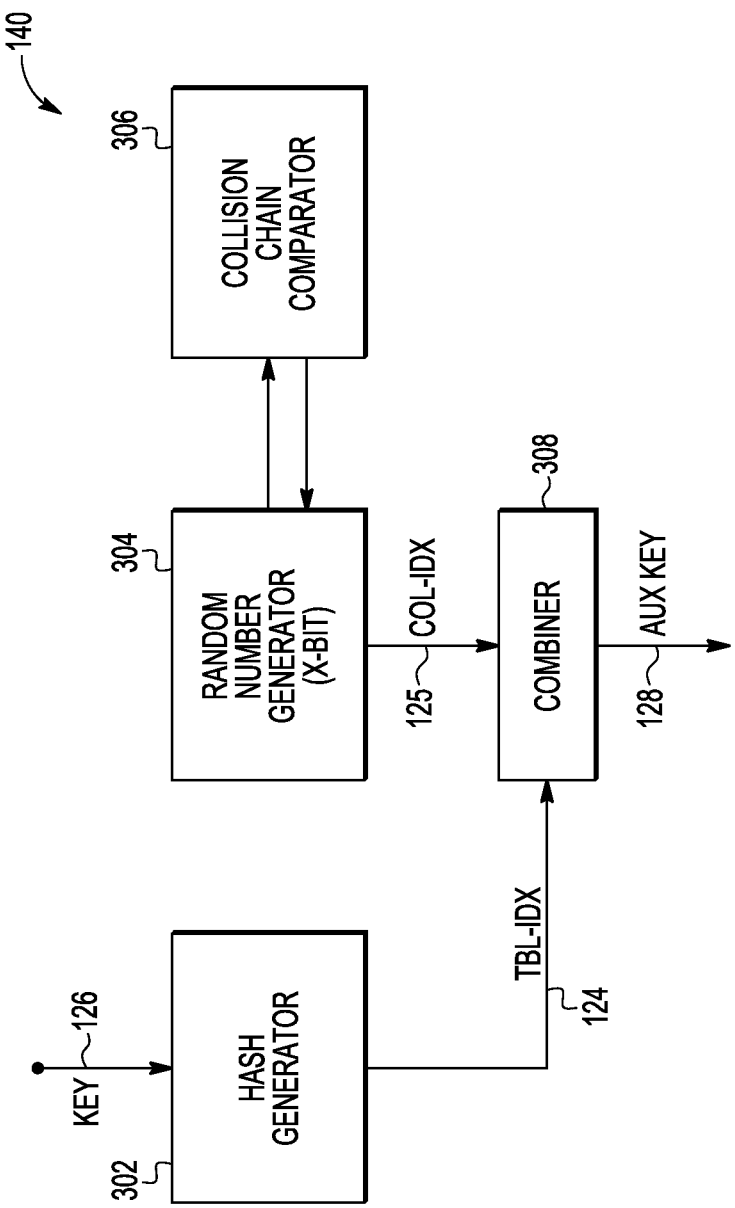
FIG. 3A is a block diagram of an example embodiment for an auxiliary key generator configured to generate a table index (TBL-IDX) and a unique collision index (COL-IDX) that are combined to form a unique auxiliary key (AUX KEY) for a new record.

FIG. 3A is an example embodiment for an auxiliary key generator 140 configured to generate a table index (TBL-IDX) 124 and a unique collision index (COL-IDX) 125 that are combined to form a unique auxiliary key (AUX KEY) 128 to be stored in an EM keyed lookup table in response to a record insertion command. A key 126 associated with a record insertion command is provided to an index generator, such as hash generator 302, that generates a table index (TBL-IDX) 124 based upon the key 126. For example, one or more hash functions can be applied to the key 126 or a portion of the key 126 to generate a hash value, and the hash value can be used as the table index (TBL-IDX) 124. A collision index (COL-IDX) generator, such as a random number generator 304, generates an X-bit value for the collision index (COL-IDX) 125. For example, the random number generator 304 can generate a random X-bit value. The collision chain comparator is then used to determine if the generated X-bit value is already being used for records within the lookup table having the same value for its table index (TBL-IDX) 124. If the X-bit value is not unique, then the random number generator 304 generates a new random X-bit value. Once a unique X-bit value has been generated, this unique X-bit value is provided to combiner 308 as the collision index (COL-IDX) 125 for the record to be inserted. The combiner 308 also receives the table index (TBL-IDX) 124 from the hash generator 302 and combines the table index (TBL-IDX) 124 with the collision index (COL-IDX) 125 to form the auxiliary (AUX) key 128 for the new records. It is noted that X can be selected based upon an expected maximum length of any record collisions within the lookup tables and/or based upon other desired parameters.

Figure 3B:
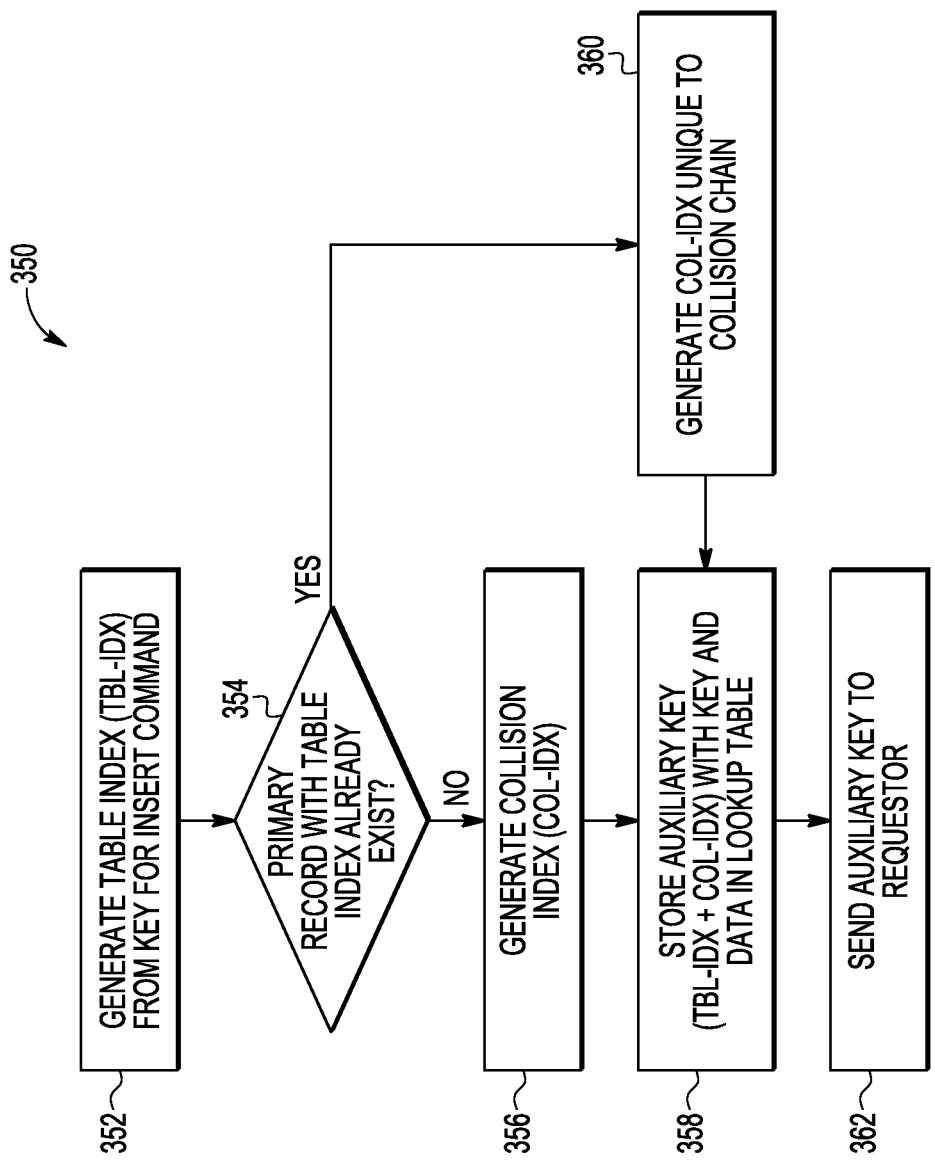
FIG. 3B is a process flow diagram of an example embodiment to determine if record collisions are associated with a generated table index (TBL-IDX) and to generate a unique collision index (COL-IDX) whether or not such collisions are present.

FIG. 3B is a process flow diagram of an example embodiment 350 to generate an auxiliary key 128 for a new record to be inserted into the lookup tables 116. In block 352, a table index (TBL-IDX) 124 is generated for a record to be inserted from the key associated with the insert command. In block 354, a determination is made whether a primary record, which has the same table index (TBL-IDX) 124, already exists at the memory location identified by the table index 124. If "NO," then flow passes to block 356 where a collision index (COL-IDX) 125 is generated. If "YES," then a record collision exists and flow passes to block 360 where a collision index (COL-IDX) 125 is generated that is unique to the collision chain. For example, if the auxiliary key generator 140 is randomly generating X-bit values for the collision index values (COL-IDXs), then X-bit values are generated until a generated value does not match any of the existing collision index values (COL-IDXs) within the collision chain. Once a collision index (COL-IDX) 125 is generated in block 356 or in block 360, block 358 is reached where the collision index (COL-IDX) 125 is combined with the table index 124 to form a unique auxiliary key 128, and the unique auxiliary key 128 is then stored for the new record along with the key 126 and the data 130 for the new record. In block 362, the auxiliary key 128 can also be sent back to the requestor that issued the insert command. While embodiment 350 uses a randomly generated number, it is again noted that a variety of techniques can be used, as desired, to generate the collision index for a given record so that the collision index does not match an existing collision index used within an existing record having the same table index.

Figure 4:
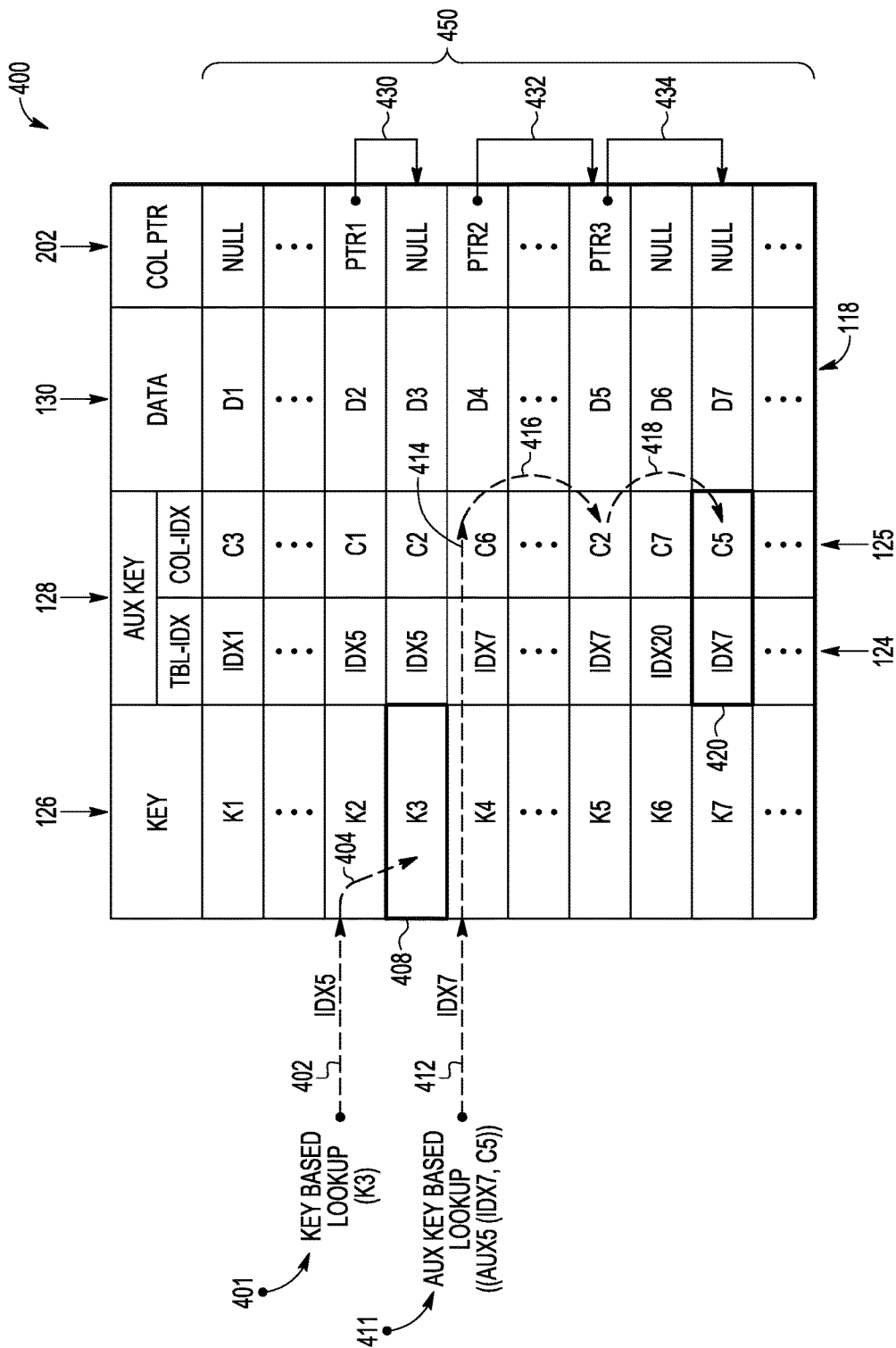
FIG. 4 is a diagram of an example embodiment for a key based lookup of a record within an EM keyed lookup table and for an auxiliary key based lookup of a record within the same EM keyed lookup table.

FIG. 4 is a diagram of an example embodiment 400 for a key based lookup 401 and an auxiliary key based lookup 411 within an example lookup table 118. For the embodiment 400, a plurality of example records 450 are included within lookup table 118, and seven of these records have example information shown for embodiment 400. The keys 126 include different keys K1, K2, K3, K4, K5, K6, and K7 that are stored for the records within the lookup table 118. The data 130 includes different data D1, D2, D3, D4, D5, D6, and D7 that is stored for the records within the lookup table 118. The table index values 124 for the auxiliary keys 128 include IDX1, IDX5, IDX7, and IDX20. Of these, IDX5 is shared by a collision chain of two records, and IDX7 is shared by a collision chain of three records. IDX1 and IDX20 can be considered to be within a collision chain of a single record. The collision index values 125 for the auxiliary keys 128 include C1, C2, C3, C5, C6, and C7. Although C2 is shared by two records, these records do not have the same table index and therefore are not in the same collision chain. As such, C2 is unique within the particular collision chains for each of these records. The collision pointers (COL PTR) 202 include pointers that link records within collision chains. For example, a collision pointer (PTR1) 430 links the primary record for the IDX5 table index to the second record in the collision chain having the same IDX5 table index. Similarly, a collision pointer (PTR2) 432 links the primary record for the IDX7 table index to the second record in the collision chain having the IDX7 table index, and a collision pointer (PTR3) 434 links the second record for the IDX7 table index to the third record in the collision chain having the IDX7 table index. The other records have a null value (NULL) within their collision pointer field 202, as these records have a collision chain of a single record and do not link to other records. It is also noted that other and/or different fields could also be used within lookup table 118 while still taking advantage of the auxiliary key lookup techniques described herein.

Looking now to the key based lookup 401, it is assumed that this lookup access command 401 is attempting to access the record with K3 as its key 126. As shown by dashed line 402, the memory management unit 114 first generates a table index IDX5 from the key K7, for example using hash generator 302, and then locates the primary record for IDX5 as shown by dashed line 402. A comparison is made between the key (K2) for this primary record and the key (K3) in the request. Because K2 does not match K3 within the request, the memory management unit 114 moves on to the next record in the collision chain as shown by dashed line 404, for example, using the collision pointer (PTR1) 430. The memory management unit 114 then compares the key (K3) for this second record to the key (K3) in the request. Because K3 does match K3 within the request, the memory management unit 114 concludes that the correct record including field 408 has been found and returns the data D3 for this record or otherwise allows access to the record.

Looking now to the auxiliary key based lookup 411, it is assumed that this lookup access request command 411 is requesting access using auxiliary key AUX5 that includes IDX7 as its table index and C5 as its collision index. The auxiliary key AUX5 can also include a table identifier, as described above. Next, as shown by dashed line 412, the memory management unit 114 first locates the primary record for IDX7. As shown by dashed line 414, a comparison is made between the collision index (C6) for this primary record and the collision index (C5) in the request. Because C6 does not match C5 within the request, the memory management unit 114 moves on to the next record in the collision chain as shown by dashed line 416, for example, using the collision pointer (PTR2) 432. The memory management unit 114 then compares the collision index (C2) for this second record to the collision index (C5) in the request. Because C2 does not match C5 within the request, the memory management unit 114 moves on to the third record in the collision chain as shown by dashed line 418, for example, using the collision pointer (PTR3) 434. The memory management unit 114 then compares the collision index C5 for this third record to the collision index C5 in the request. Because C5 does match C5 within the request, the memory management unit 114 concludes that the correct record including field 420 has been found and returns the data D7 for this record or otherwise allows access to the record.

By enhancing the lookup table 118 with the auxiliary keys 128, therefore, table lookups and record access are allowed to be performed using both keys 126 and auxiliary keys 128. It is again noted that the size for the collision index (COL-IDX) 125 can be selected to be a fixed length such that the number of possible values that can be generated exceeds a maximum expected number of collisions. For example, the size for the fixed length can be selected to be 2 bits to provide four (4) possible values, to be 3 bits to provide eight (8) possible values, or to be 4 bits to provide sixteen (16) possible values. In many implementations, the maximum number of expected collisions where records will have the same table index will be less than sixteen (16) records, thereby allowing for a four-bit fixed length value to be used for the generation of collision index values. It is noted, however, that other bit sizes can also be used, including larger or smaller bit sizes, depending upon the implementation and/or the maximum number of expected collisions. Because the collision index values 125 need only be large enough in size to address the maximum number of collisions expected for the lookup table, the auxiliary key based lookup can be performed at more quickly and efficiently than the key based lookup.

Figure 5:
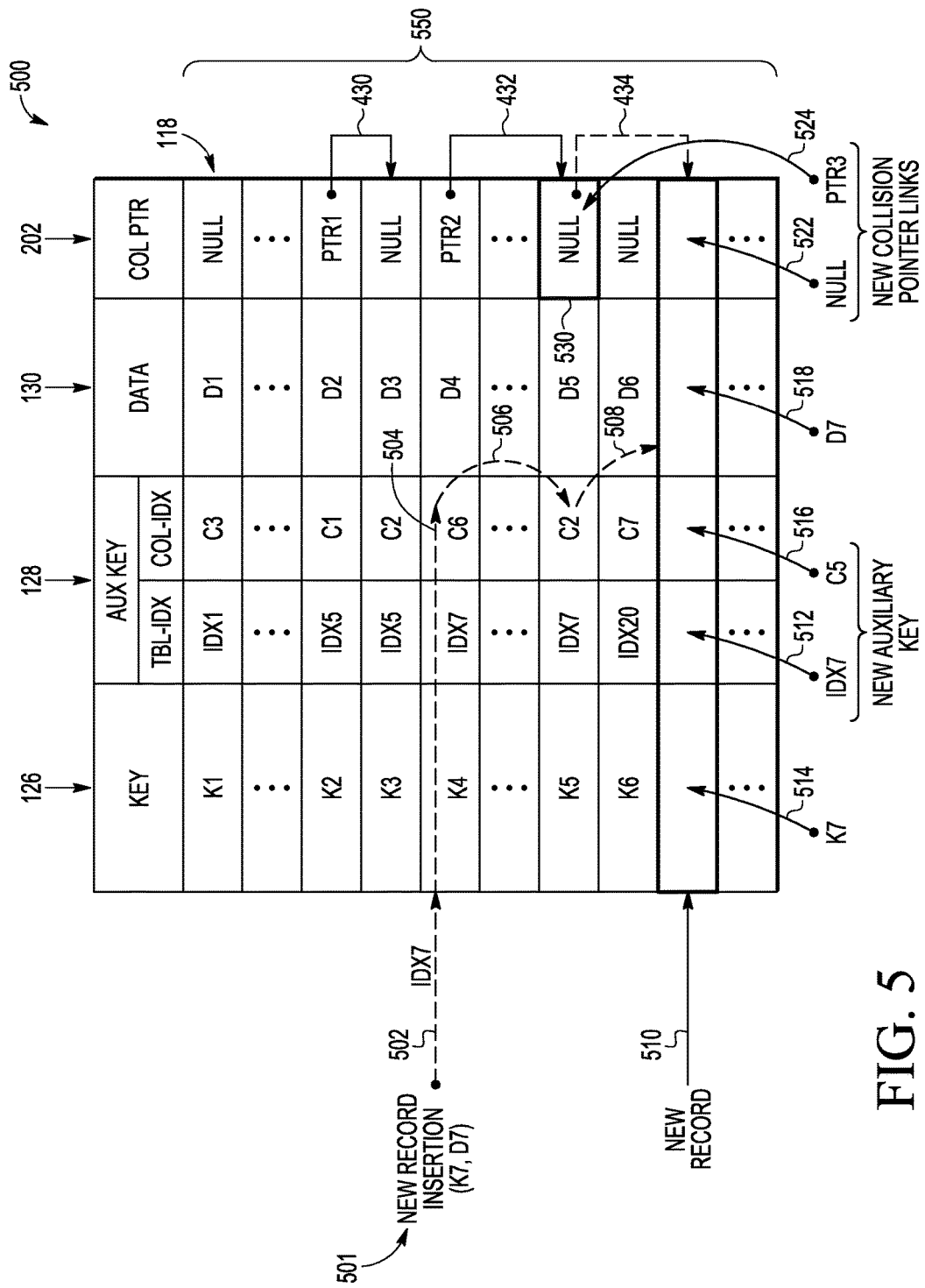
FIG. 5 is a diagram of an example embodiment for insertion of a new record that is added to the end of an existing collision chain within an EM keyed lookup table.

FIG. 5 is a diagram of an example embodiment 500 for insertion of a new record that is added to the end of an existing collision chain within lookup table 118. For the embodiment 500, a plurality of example records 550 are included with six of the records having example information that matches embodiment 400 in FIG. 4 above. However, for embodiment 500, a new record 510 matching the last record in embodiment 400 is being inserted based upon a new record insertion command 501. It is assumed that this command 501 is to insert a record includes K7 for the key and D7 for the data. For this insert command 501, the memory management unit 114 first determines if a primary record already exists having IDX7 as its table index 124. As shown by dashed line 502, the primary record for IDX7 is identified, and the memory management unit 114 determines that C6 has already been used as collision index value for this collision chain. The memory management unit 114 then moves on to the second record in the collision chain as shown by dashed line 506, for example, using the collision pointer (PTR2) 432. The memory management unit 114 then determines that C2 has also been used as collision index value for this collision chain. As the last record in the collision chain has been reached (e.g., a NULL value is found in the record's collision pointer field 530), the memory management unit 114 then generates collision index value 125 for the new record 510 that is unique for the collision chain. For this example embodiment 500, therefore, C2 and C6 will not be used for this new collision index value because they are already in use for existing records within the IDX7 collision chain. As shown, it is assumed that C5 has been generated by the memory management unit 114 as the collision index for the new record 510. For the new record 510, the memory management unit 114 then stores IDX7 for the table index 124 as indicated by arrow 512, stores K7 for the key 126 as indicated by arrow 514, stores C5 for the collision index 125 as indicated by arrow 516, and stores D7 as the data 130 as indicated by arrow 518. The memory management unit 114 also modifies the collision pointers 202 for the collision chain. In particular, collision pointer 530 is modified to add collision pointer (PTR3) as indicated by arrow 524, and collision pointer PTR3 links to the new record 510 as indicated by dashed arrow 434. In addition, a NULL value is inserted as the collision pointer 202 for the new record 510 as indicated by arrow 522.

Figure 6:
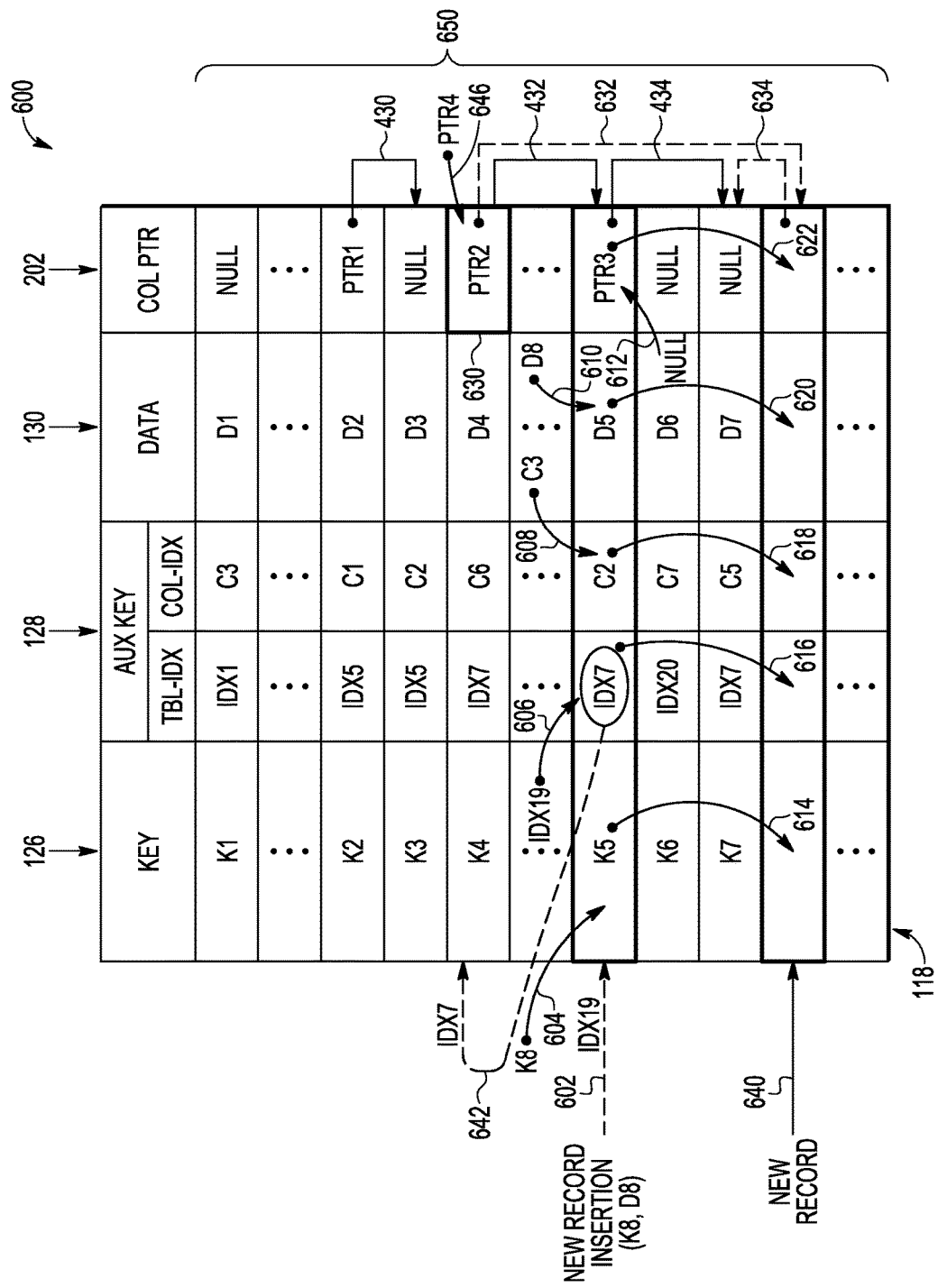
FIG. 6 is a diagram of an example embodiment for insertion of a new record at a location within an EM keyed lookup table where an existing record is moved from that location.

FIG. 6 is a diagram of an example embodiment 600 for insertion of a new record at a location within a lookup table 118 where the existing record at this location is moved to a new location while staying within its original collision chain. For the embodiment 600, a plurality of example records 650 are included with seven of the records having example information that matches embodiment 400 in FIG. 4. However, for embodiment 600, an existing record is being move to a new location as record 640 based upon a new record insertion command 601. It is assumed that this command 601 to insert a record includes K8 for the key and D8 for the data. For this insert command 601, the memory management unit 114 first generates the table index IDX19 from the key K8, for example using hash generator 302, and then locates the memory location associated with IDX19 as shown by dashed line 602. The memory management unit 114 then identifies that the record at this location is not a primary record but instead is part of a collision chain including IDX7. As such, the key 126, the auxiliary key 128, the data 130, and the collision pointer 202 for this record are moved to a new record 640 as indicated by arrows 614, 616, 618, 620, and 622. As represented by dashed arrow 634, the collision pointer PTR3 still points to the next record in the collision chain. The memory management unit 114 also locates the primary record for the IDX7 collision chain as indicated by dashed line 642, and a new collision pointer (PTR4) is inserted into collision pointer 630 for this record as indicated by arrow 646. This new collision pointer PTR4 points to the new record 640 as indicated by dashed arrow 632. The memory management unit 114 also inserts information associated with the record insertion command 601 into the lookup table 118 at the memory location identified by table index IDX19 as represented by arrows 604, 606, 608, 610, and 612. It is noted that C3 is assumed to be the collision index, and NULL is included as the collision pointer as the new record is not part of a multiple record collision chain.

As described herein, a variety of embodiments can be implemented and different features and variations can be implemented, as desired.

For one embodiment, a method to access memory locations is disclosed including receiving an insertion command to insert a new record into a lookup table stored in a data storage system where the lookup table being configured to store records including keys, auxiliary keys, and data; receiving a key and data for the new record along with the insertion command; generating a table index for the new record based upon the key; generating a collision index for the new record; combining the table index and the collision index to form an auxiliary key that is unique for the lookup table; storing the key, the auxiliary key, and the data for the new record within the lookup table; and allowing subsequent access commands to access the new record using the key for the new record or using the auxiliary key for the new record.

In additional embodiments, the insertion command is received from a packet processor, and the method further includes communicating the auxiliary key generated for the new record to packet processor. In further embodiments, the subsequent access commands include at least one of a deletion command to delete a record from the lookup table, a read command to read data from a record within the lookup table, and a write command to write data to a record within the lookup table. In still further embodiments, the table index is generated as a hash value based upon the key, and the collision index is generated as a random value. In other embodiments, the collision index is generated as a random value having a fixed length.

In additional embodiments, the method also includes determining if the table index matches an existing table index for one or more existing records already stored within the lookup table, and generating the collision index so that it is different from any existing collision index stored for any existing record with a matching table index. In further embodiments, the method also includes, if one or more matches is found, linking the new record to the one or more records with a matching table index. In still further embodiments, the linking includes using one or more collision pointers to link the new record with the one or more records with a matching table index.

In additional embodiments, a plurality of lookup tables are stored within the data storage system, and the method also includes selecting one of the lookup tables for the insertion command and for the subsequent access commands. In further embodiments, the auxiliary key further includes a table identifier, and the method also includes using the table identifier to select one of the lookup tables for the insertion command.

For one embodiment, a system to access memory locations is disclosed including a data storage system comprising a lookup table configured to store records including keys, auxiliary keys, and data; a memory management unit configured to receive insertion commands to insert new records into the lookup table where each insertion command to insert being associated with a key and data; and an auxiliary key generator configured to generate a table index for the new record based upon the key, to generate a collision index for the new record, and to combine the table index and the collision index to form an auxiliary key that is unique for the lookup table. The memory management unit is also further configured to store the key, the auxiliary key, and the data for the new record within the lookup table and to allow subsequent access commands to access the new record with the key for the new record or with the auxiliary key for the new record.

In additional embodiments, the memory management unit is coupled to receive the insertion commands from a packet processor and to communicate the auxiliary key for the new record to the packet processor. In further embodiments, the subsequent access commands include at least one of a deletion command to delete a record from the lookup table, a read command to read data from a record within the lookup table, and a write command to write data to a record within the lookup table. In still further embodiments, the table index is a hash value based upon the key, and the collision index is a randomly generated value. In other embodiments, a random number generator configured to generate a random value having a fixed length for the collision index.

In additional embodiments, the memory management unit is further configured to determine if the table index matches an existing table index already stored for one or more existing records within the lookup table and to generate the collision index so that it is different from any existing collision index for any existing record with a matching table index. In further embodiments, the memory management unit is configured to link the new record to the one or more records with a matching table index if one or more matches is found. In still further embodiments, the memory management unit is configured to use one or more collision pointers to link the new record with the one or more records with a matching table index.

In additional embodiments, a plurality of lookup tables are stored within the data storage system, and the memory management unit is configured to select one of the lookup tables for the insertion command and for the subsequent access commands. In further embodiments, the auxiliary key further includes a table identifier, and the memory management unit is further configured to use the table identifier to select one of the lookup tables for the insertion command.

It is further noted that the functional blocks, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are executed by one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method to access memory locations, comprising:
receiving an insertion command to insert a new record into a lookup table stored in a data storage system, the lookup table being configured to store records including variable-size keys, fixed-size auxiliary keys, and data;
receiving a variable-size key and data for the new record along with the insertion command;
generating a fixed-size table index for the new record based upon the variable-size key, the fixed-size table index being generated as a hash value based upon the variable-size key;
generating a fixed-size collision index for the new record, the fixed-size collision index being generated as a unique value with respect to any other records having the same fixed-size table index;
combining the fixed-size table index and the fixed-size collision index to form a fixed-size auxiliary key that is unique for the lookup table;
storing the variable-size key, the fixed-size auxiliary key, and the data for the new record within the lookup table; and
allowing subsequent access commands to access the new record using both the variable-size key for the new record and using the fixed-size auxiliary key for the new record.

2. The method of claim 1, wherein the insertion command is received from a packet processor, and further comprising communicating the fixed-size auxiliary key generated for the new record to packet processor.

3. The method of claim 1, wherein the subsequent access commands comprise at least one of a deletion command to delete a record from the lookup table, a read command to read data from a record within the lookup table, and a write command to write data to a record within the lookup table.

4. The method of claim 1, wherein the fixed-size collision index is based upon at least one of a randomly generated value or a counter value.

5. The method of claim 1, further comprising determining if the fixed-size table index matches an existing fixed-size table index for one or more existing records already stored within the lookup table, and generating the fixed-size collision index so that it is different from any existing fixed-size collision index stored for any existing record with a matching fixed-size table index.

6. The method of claim 5, further comprising, if one or more matches is found, linking the new record to the one or more records with a matching fixed-size table index.

7. The method of claim 6, wherein the linking comprises using one or more collision pointers to link the new record with the one or more records with a matching fixed-size table index.

8. The method of claim 1, wherein the fixed-size collision index is generated as a random value having a fixed length.

9. The method of claim 1, wherein a plurality of lookup tables are stored within the data storage system, and further comprising selecting one of the lookup tables for the insertion command and for the subsequent access commands.

10. The method of claim 9, wherein the fixed-size auxiliary key further includes a table identifier, and further comprising using the table identifier to select one of the lookup tables for the insertion command.

11. A system to access memory locations, comprising:
a data storage system comprising a lookup table configured to store records including variable-size keys, fixed-size auxiliary keys, and data;
a memory management unit configured to receive insertion commands to insert new records into the lookup table, each insertion command to insert being associated with a variable-size key and data; and
an auxiliary key generator configured to generate a fixed-size table index for the new record based upon the variable-size key, to generate a fixed-size collision index for the new record, and to combine the fixed-size table index and the fixed-size collision index to form a fixed-size auxiliary key that is unique for the lookup table;
wherein the fixed-size table index is a hash value based upon the variable-size key;
wherein the fixed-size collision index is a unique value with respect to any other records having the same fixed-size table index; and
wherein the memory management unit is further configured to store the variable-size key, the fixed-size auxiliary key, and the data for the new record within the lookup table and to allow subsequent access commands to access the new record both with the variable-size key for the new record and with the fixed-size auxiliary key for the new record.

12. The system of claim 11, wherein the memory management unit is coupled to receive the insertion commands from a packet processor and to communicate the fixed-size auxiliary key for the new record to the packet processor.

13. The system of claim 11, wherein the subsequent access commands comprise at least one of a deletion command to delete a record from the lookup table, a read command to read data from a record within the lookup table, and a write command to write data to a record within the lookup table.

14. The system of claim 11, wherein the fixed-size collision index is based upon at least one of a randomly generated value or a counter value.

15. The system of claim 11, wherein the memory management unit is further configured to determine if the fixed-size table index matches an existing fixed-size table index already stored for one or more existing records within the lookup table and to generate the fixed-size collision index so that it is different from any existing fixed-size collision index for any existing record with a matching fixed-size table index.

16. The system of claim 15, wherein the memory management unit is configured to link the new record to the one or more records with a matching fixed-size table index if one or more matches is found.

17. The system of claim 16, wherein the memory management unit is configured to use one or more collision pointers to link the new record with the one or more records with a matching fixed-size table index.

18. The system of claim 11, further comprising a random number generator configured to generate a random value having a fixed length for the fixed-size collision index.

19. The system of claim 11, wherein a plurality of lookup tables are stored within the data storage system, and wherein the memory management unit is configured to select one of the lookup tables for the insertion command and for the subsequent access commands.

20. The system of claim 19, wherein the fixed-size auxiliary key further includes a table identifier, and wherein the memory management unit is further configured to use the table identifier to select one of the lookup tables for the insertion command.

* * * * *